(12) United States Patent
Hallenstal et al.

(10) Patent No.: US 8,891,447 B2
(45) Date of Patent: Nov. 18, 2014

(54) METHOD AND A MOBILE TERMINAL FOR ROAMING IN A MOBILE NETWORK

(75) Inventors: Magnus Hallenstal, Taby (SE); Jari Vikberg, Jarna (SE)

(73) Assignee: Optis Cellular Technology, LLC, Plano, TX (US)

( * ) Notice: Subject to any disclaimer, the term of this patent is extended or adjusted under 35 U.S.C. 154(b) by 448 days.

(21) Appl. No.: 13/144,327

(22) PCT Filed: Jan. 12, 2010

(86) PCT No.: PCT/SE2010/050018
§ 371 (c)(1),
(2), (4) Date: Jul. 13, 2011

(87) PCT Pub. No.: WO2010/082895
PCT Pub. Date: Jul. 22, 2010

(65) Prior Publication Data
US 2011/0274049 A1    Nov. 10, 2011

Related U.S. Application Data

(60) Provisional application No. 61/144,815, filed on Jan. 15, 2009.

(51) Int. Cl.
| | |
|---|---|
| *H04W 4/00* | (2009.01) |
| *H04W 8/06* | (2009.01) |
| *H04W 48/04* | (2009.01) |
| *H04W 48/18* | (2009.01) |
| *H04W 48/02* | (2009.01) |
| *H04W 48/16* | (2009.01) |
| *H04W 48/00* | (2009.01) |

(52) U.S. Cl.
CPC ............. *H04W 8/06* (2013.01); *H04W 48/04* (2013.01); *H04W 48/18* (2013.01); *H04W 48/02* (2013.01); *H04W 48/16* (2013.01); *H04W 48/17* (2013.01); *H04W 48/00* (2013.01)

USPC .......................................... 370/328; 370/338

(58) Field of Classification Search
None
See application file for complete search history.

(56) References Cited

U.S. PATENT DOCUMENTS

2008/0043669 A1 *    2/2008    Gallagher et al. ............ 370/329

FOREIGN PATENT DOCUMENTS

| WO | 2008148432 A1 | 12/2008 |
| WO | 2009000316 A1 | 12/2008 |
| WO | 2009000318 A1 | 12/2008 |

OTHER PUBLICATIONS

Author Unknown, G2-070344, 3GPP TSG-GERAN Submission at meeting 36, Oct. 10, 2007, pp. 1-3.*

(Continued)

*Primary Examiner* — Christopher Crutchfield
(74) *Attorney, Agent, or Firm* — Vincent J. Allen; James H. Ortega; Carstens & Cahoon, LLP (57) ABSTRACT

The invention comprises a method for a mobile terminal (1010) to register to a generic access node controller, GANC (1030) in a Circuit Switched Services over Long Term Evolution using Generic Access Network, CSOLTEVGAN architecture. In current procedures for roaming, the mobile terminal (1010) receives an address to a serving GANC (1030) in the same VPLMN from a default GANC (1050) in the HPLMN, This procedure results in a lot of signaling towards the default GANC (1050). The current invention overcomes this problem by adapting the mobile terminal (1010) to determine system information about the E-UTRAN cell by which the mobile terminal (1010) is served and to build a FQDN string based on the system information. This FQDN string is sent to a DNS server (1060) which resolves it to an IP address to a GANC (1030) located in the same VPLMN as the mobile terminal (1010). This IP address is used by the mobile terminal (1010) to connect and register itself to the GANC (1030).

20 Claims, 12 Drawing Sheets

(56) References Cited

OTHER PUBLICATIONS

3GPP TS 44.318 V8.4.0 (Dec. 2008); 3rd Generation Partnership Project; Technical Specification Group GSM/EDGE Radio Access Network Generic Access Network (GAN); Mobile GAN interface layer 3 specification (Release 8) section 5, 6 pages.

3GPP TR 23.879 V1.1.1 (Dec. 2008); 3rd Generation Partnership Project; Technical Specification Group Services and System Aspects; Study on Circuit Switched (CS) domain services over evolved Packet Switched (PS) access; Stage 2 (Release 9), section 5, 56 pages.

* cited by examiner

Figure 1

LTE/SAE ARCHITECTURE FROM 3GPP TS 23.401

CSoLTE REFERENCE ARCHITECTURE

Figure 4

CSoLTE CONTROL PLANE PROTOCOL ARCHITECTURE

Figure 5

CSoLTE USER PLANE PROTOCOL ARCHITECTURE

CS DOMAIN CONTROL PLANE ARCHITECTURE
RELATED TO THE Up-INTERFACE

Figure 8

Figure 9
CSoLTEvGAN AND REGISTRATION IN ROAMING SCENARIO

METHOD AND A MOBILE TERMINAL FOR ROAMING IN A MOBILE NETWORK

CROSS-REFERENCE TO RELATED APPLICATIONS

This application is a 35 U.S.C. §371 National Phase Entry Application from PCT/SE2010/050018, filed Jan. 12, 2010, and designating the United States, which claims the benefit of U.S. Application Ser. No. 61/144,815, filed Jan. 15, 2009, the disclosure of which is incorporated by reference herein in its entirety.

TECHNICAL FIELD

The present invention relates to a method and a mobile terminal adapted for roaming in a mobile network, especially a Long Term Evolution LTE, based radio access network.

BACKGROUND

Mobile CS (Circuit Switched) services based on GSM (2G) and WCDMA (3G) radio access are a world-wide success story and allow obtaining telecommunication services with a single subscription in almost all countries of the world. Also today, the number of CS subscribers is still growing rapidly, boosted by the role out of mobile CS services in dense population countries such as India and China. This success story is furthermore extended by the evolution of the classical MSC architecture into a softswitch solution which allows using packet transport infrastructure for mobile CS services.

In 2006 the 3GPP group started with a work item called "Evolved UTRA and UTRAN" which become commonly known under the acronym E-UTRAN, Evolved Universal Terrestrial Radio Access. The purpose of the work item was to define a Long-Term Evolution (LTE) concept that assures competitiveness of 3GPP-based access technology.

LTE will use OFDM radio technology in the downlink and SC-FDMA for the uplink, allowing at least 100 Mbps peak data rate for downlink data rate and 50 Mbps for uplink data rate. LTE radio can operate in different frequency bands and is therefore very flexible for deployment in different regions of the world.

In parallel to Radio Access Network (RAN) standardization for the LTE, 3GPP also drives a System Architecture Evolution (SAE) work item to develop an evolved packet core network. The SAE core network is made up of core nodes such as Control Plane nodes as the MME, Mobility Management Entity and User Plane nodes as the Serving Gateway (S-GW) and the Packet Data Network Gateway (PDN GW or P-GW). A co-location of the S-GW and the P-GW is also denoted Access Gateway (AGW).

Common to LTE/SAE is that only a Packet Switched (PS) domain will be specified, i.e. all services are to be supported via this domain. GSM and WCDMA however provide both PS and CS access simultaneously. So if telephony services shall be deployed over LTE radio access, an IMS based service engine is mandatory.

It has been investigated how to use LTE/SAE as access technology to the existing CS core domain infrastructure. The investigated solutions are called "CS over LTE" solutions. Three different solutions have been identified so far.

The first solution is called "CS Fallback" and means that a mobile terminal is performing SAE MM (mobility Management) procedures towards the MME while camping on LTE access. The MME registers the terminal in a MSC-S for CS based services. When a page for CS services is received in the MSC-S it is forwarded to the terminal via the MME and then the terminal performs fallback to the 2G or 3G RANs. Similar behavior applies for Mobile originated CS services and when these are triggered and the terminal is camping on LTE access, it will fallback to 2G or 3G RANs and trigger the initiation of the CS service there. This solution has been specified in the technical standard 3GPP TS 23.272.

The second solution is called CS over LTE Integrated (CSoLTE-I). In this solution the same SAE MM procedures as for "CS Fallback" are used, but instead of performing fallback to the 2G or 3G RANs, the terminal will perform all the CS services over the LTE access. This means that the CS services (also called Connection Management, CM procedures) are transported over IP-based protocols between a Packet MSC PMSC and the terminal using the LTE access and the SAE nodes like the AGW.

The third solution is called CS over LTE Decoupled (CSoLTE-D). In this case both MM and CM procedures are transported over IP-based protocols directly between the PMSC and the terminal using the LTE access and the SAE user plane nodes like the AGW.

3GPP has also standardized the Generic Access Network (GAN) concept starting from 3GPP Release-6. The more correct name is "Generic Access to A/Gb Interfaces" and this standardization was based on the Unlicensed Mobile Access (UMA) de-facto specifications.

GAN provides a new radio access network and the node corresponding to the GERAN (GSM EDGE Radio Access Network) BSC is called Generic Access Network Controller (GANC). GAN is specified in the 3GPP TS 43.318 and TS 44.318. The basic principle is that the mobile terminal (in the specifications called MS, Mobile Station) is a dual-mode radio handset including for example both WiFi and 3GPP-macro radio support (GSM, WCDMA or both). The mobile terminal connects to a WiFi Access point (AP) using the WiFi Radio. The GAN standard defines for example how the mobile terminal can function in GAN mode and access the services provided by the GSM CN (Core Network) using the Up-interface between the mobile terminal and the GANC.

The main principle in GAN is that the mobile terminal is configured with Provisioning GANC address information and this is the initial point of contact in the network and the mobile terminal triggers the GAN Discovery procedure towards the Provisioning GANC that is placed in the Home Public Land Mobile Network HPLMN. The only purpose of the GAN Discovery procedure is to provide the mobile terminal with information about a Default GANC that also resides in the HPLMN. The Default GANC is the node where the mobile terminal always connects to initially when it attempts to use GAN in a new location. The Default GANC may redirect the mobile terminal to a Serving GANC that may be placed either in the HPLMN or in a VPLMN (Visited PLMN). The mobile terminal may also store information about Serving GANCs in a Serving GANC table.

The main principle in the CS Domain Control Plane Architecture related to GAN and the Up-interface is that the GANC uses the normal A-interface signaling towards the MSC. The GANC interworks the related protocol, like BSSAP, towards the relevant GAN-protocols, like GA-CSR (Generic Access, Circuit Switched Resources), in both directions.

The solution of using the GAN concept for CS over LTE (CSoLTEvGAN) is disclosed in the 3GPP technical report TR 23.879 as one of the alternatives for CS service support over LTE. The technical report covers a number of different alternatives. The basic idea for the CSoLTEvGAN alternative is to see LTE as a Generic Access Network and to use the GAN protocols for control and user plane.

The current CAN principles do support roaming scenarios, but the main principle is that the mobile terminal in a VPLMN contacts a Default GANC in the HPLMN for each new location (i.e. E-UTRAN TA, Tracking Area or cell in the CSoLTEvGAN solution) and then the Default GANC in the HPLMN redirects the mobile terminal to a Serving GANC in the current VPLMN.

This approach does however have the following drawbacks:

It would mean a lot of signaling towards the Default GANC in the HPLMN which also need to keep addresses to all GANCs in all VPLMNs.

The packet data network PDN used in the VPLMN and HPLMN might use overlapping address spaces, thus there could be problems for the mobile terminal to connect to the Default GANC in HPLMN from VPLMN.

If a Virtual Private Network VPN is used for the connectivity between the GANCs and CSoLTEvGAN mobile terminals it will be a security problem to connect between these VPNs.

New roaming configuration is needed if normal GAN redirection is used, thus each Default GANC in the HPLMN must have the address of at least one GANC for every VPLMN.

SUMMARY

It is the object of the present invention to avoid at least one of the problems mentioned above. The invention comprises a method for a mobile terminal to register to the GANC using the following steps. First, the mobile terminal determines system information about the E-UTRAN cell by which the mobile terminal is served. This system information could for example be any or a combination of the following:

a tracking area code, TAC value.

an identification, PLMN-ID, of the visited public land mobile network (VPLMN) within which the mobile terminal is located.

The next step is to build a Fully Qualified Domain Name, FQDN string based on the system information. Alternatively, if it is determined that the CSoLTEvGAN architecture has its own Access Point Name (APN), a predefined FQDN string is used. The FQDN string is sent to a DNS, Domain Name System server. The DNS server resolves the FQDN string to an IP address to a GANC located in the same VPLMN as the mobile terminal. This IP address is returned to the mobile terminal which establishes a transmission control protocol, TCP connection with the GANC. When the TCP connection has been established, the mobile terminal registers itself by sending a register request to the GANC.

The invention also comprises a method to discover a local default GANC within the same VPLMN as the mobile terminal by sending a register request to a default GANC in the HPLMN. The default GANC in the HPLMN responds with the address to the local default GANC. This local default GANC is assigned to be the GANC to which the mobile terminal sends future register requests as long as it is connected to or camped on the same VPLMN.

The invention further comprises a mobile terminal adapted to discover or to register to a generic access node controller, GANC according to the methods described above.

One advantage with the invention is that it results in less signaling load towards the Default GANC in the HPLMN and that the default GANC does not need to keep addresses to all GANCs in all VPLMNs. Another advantage is that if the mobile terminal looses contact with the current GANC, it could simply perform the method again in order to get an address to a new GANC.

DETAILED DESCRIPTION

In order to illustrate the prior art related to the invention, the description refers to a number figures where some of them also can be found in different specifications on different network architectures. Different terms like MS (Mobile Station) and UE (User Equipment) are used in the figures but these are equally referred to in the description and the claims as Mobile Terminals.

Figure 1:
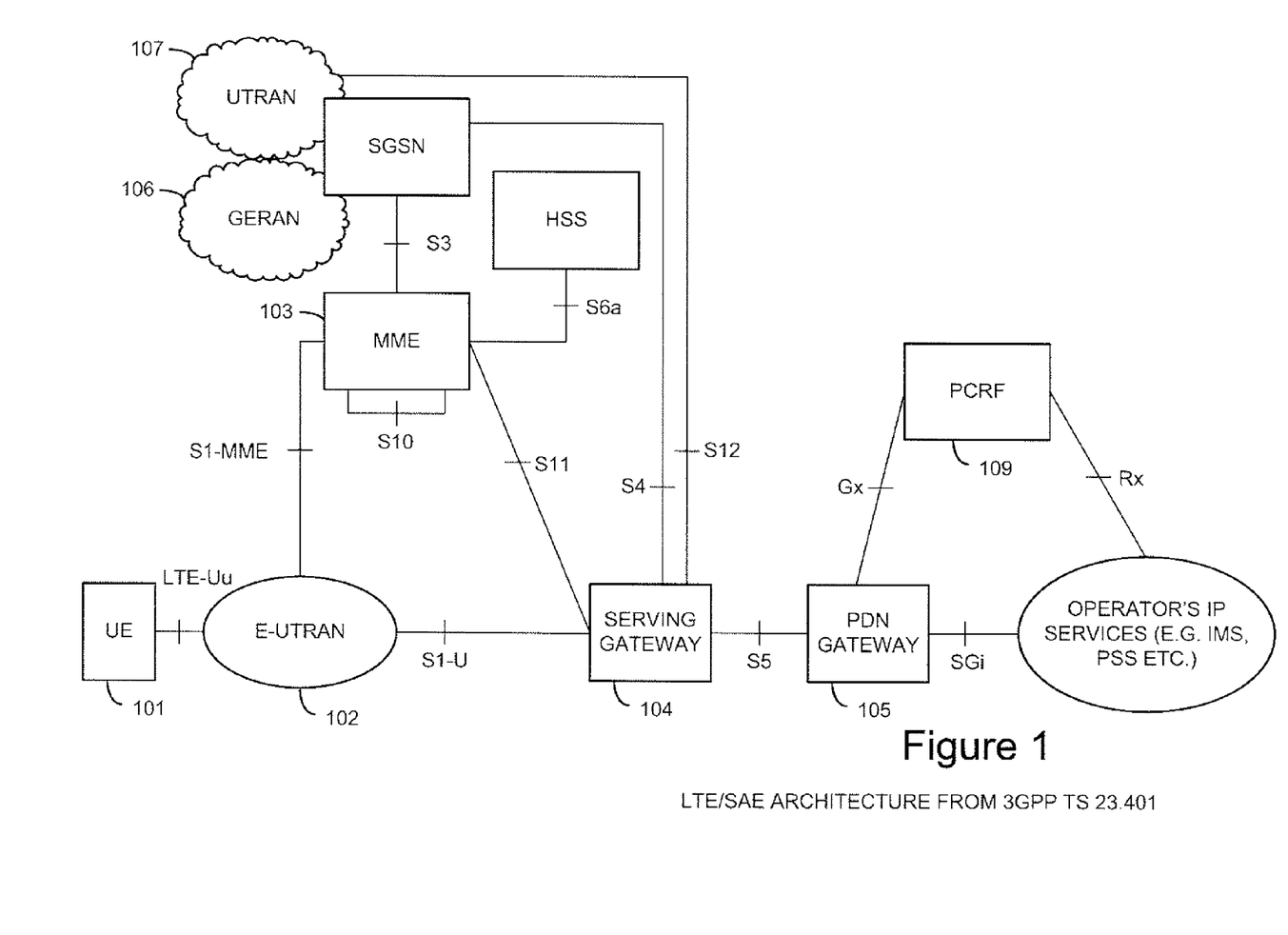
FIG. 1 is a block diagram illustrating the LTE/SAE architecture.

FIG. 1 illustrates the LTE/SAE architecture as described in the 3GPP technical specification TS 23.401 (figure 4.2.1-1). The architecture comprises a number of network elements and interfaces in between. The radio interface for example corresponds to the LTE-Uu interface between the mobile terminal UE 101 and the radio access network E-UTRAN 102. The radio access network E-UTRAN 102 further comprises at least one base station (not shown in FIG. 1) called eNodeB.

The SAE core network is made up of core nodes such as Control Plane nodes as the MME, Mobility Management Entity 103 and User Plane nodes as the Serving Gateway (S-GW) 104 and the Packet Data Network Gateway (PDN GW or P-GW) 105. A co-location of the S-GW 104 and the P-GW 105 is also denoted Access Gateway (AGW).

Common to the LTE/SAE architecture is that only a Packet Switched (PS) domain will be specified, i.e. all services are to be supported via this domain. GSM/GERAN 106 and WCDMA/UTRAN 107 however provide both PS and CS access simultaneously. So if telephony services shall be deployed over the LTE radio access LTE-Uu and the E-UTRAN 102, an IMS based service engine is mandatory.

Figure 2:
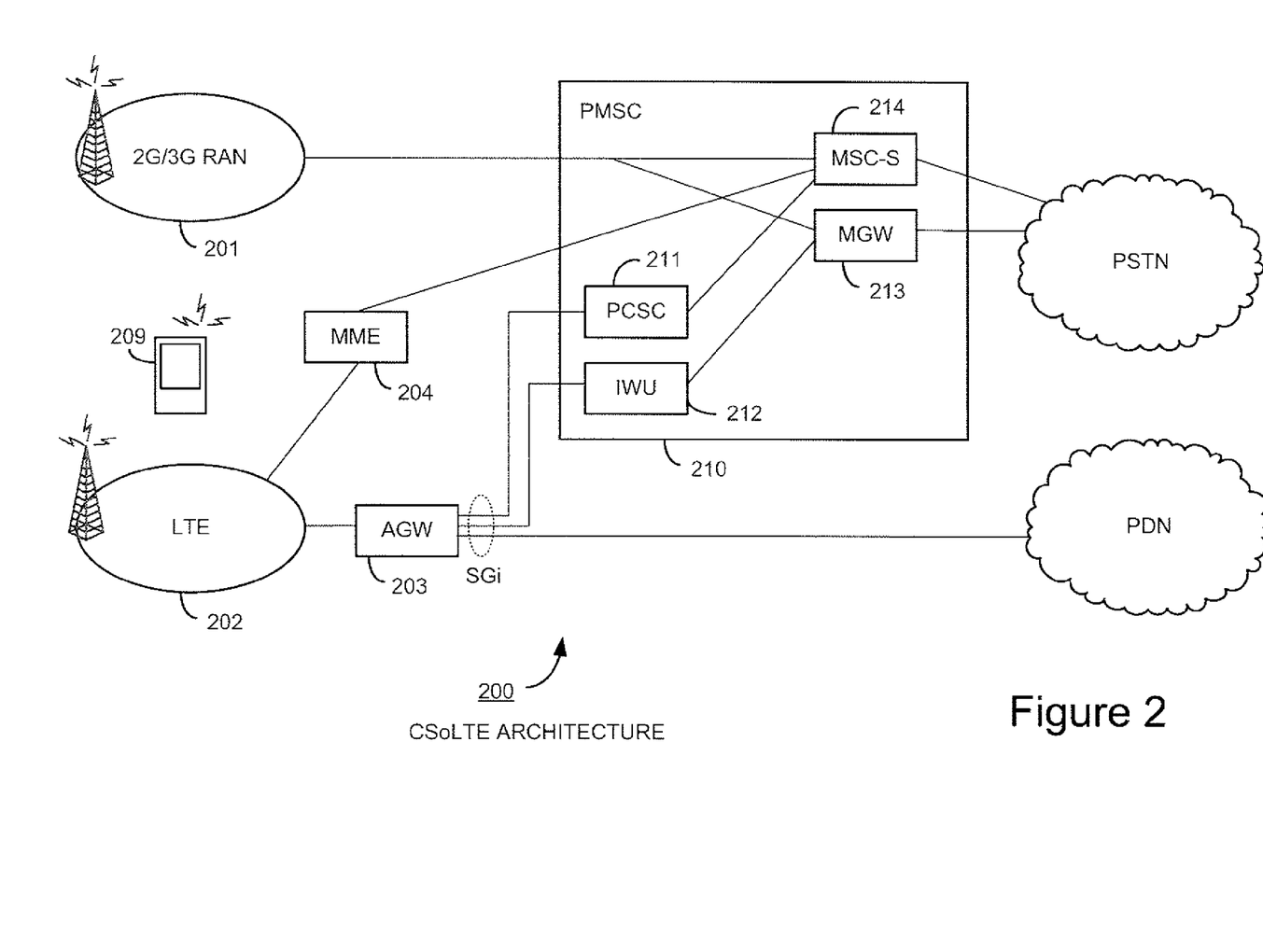
FIG. 2 is a block diagram illustrating the CSoLTE architecture.

It has been investigated how to use LTE/SAE as access technology to the existing CS core domain infrastructure. The investigated solutions are called "CS over LTE" solutions and the basic architecture 200 for these solutions is illustrated by FIG. 2.

A Packet MSC (PMSC) 210 can be serving both traditional 2G and 3G radio access networks, RANs 201 and the new CS (domain) over LTE based solutions 202. The PMSC 210 contains two new logical functions called a Packet CS Controller (PCSC) 211 and an Interworking Unit (IWU) 212. Between the LTE 202 and the PMSC 210 an access gateway AGW 203 is located. This AGW 203 can in some implementations be separated into two gateways an S-GW and a P-GW as described above. The PMSC 210 further comprises a Media Gateway MOW 213. FIG. 2 also includes a mobile terminal 209, a Mobility Management Entity, MME 204 and an MSC server 214.

Figure 3:
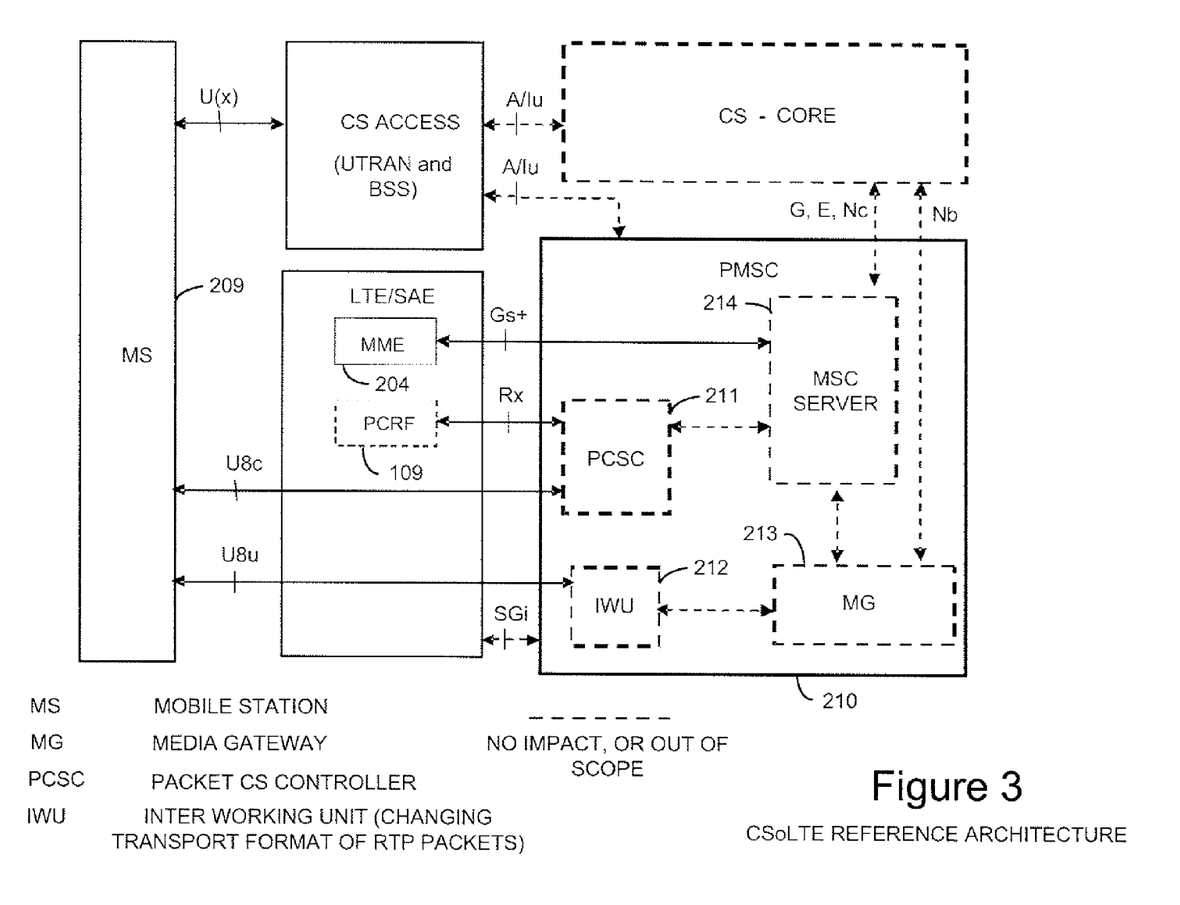
FIG. 3 is a block diagram illustrating the CSoLTE reference architecture.

The functions and the interfaces of the PMSC 210 are further illustrated in FIG. 3. The communication between the mobile terminal 209 (in FIG. 3 called MS, Mobile Station) and the PMSC 210 is based on the SGi interface. This means that all direct communication between the mobile terminal 209 and the PCSC 210 and the IWU 212 in the PMSC 210 is based on IP protocols and that the mobile terminal 209 is visible and reachable using an IP-address via the AGW 203. This communication is divided into two different interfaces, U8c for the control plane and U8u for the user plane. The PCSC 210 has also an Rx interface to the PCRF 109 for allocation of LTE/SAE bearers.

Figure 4:
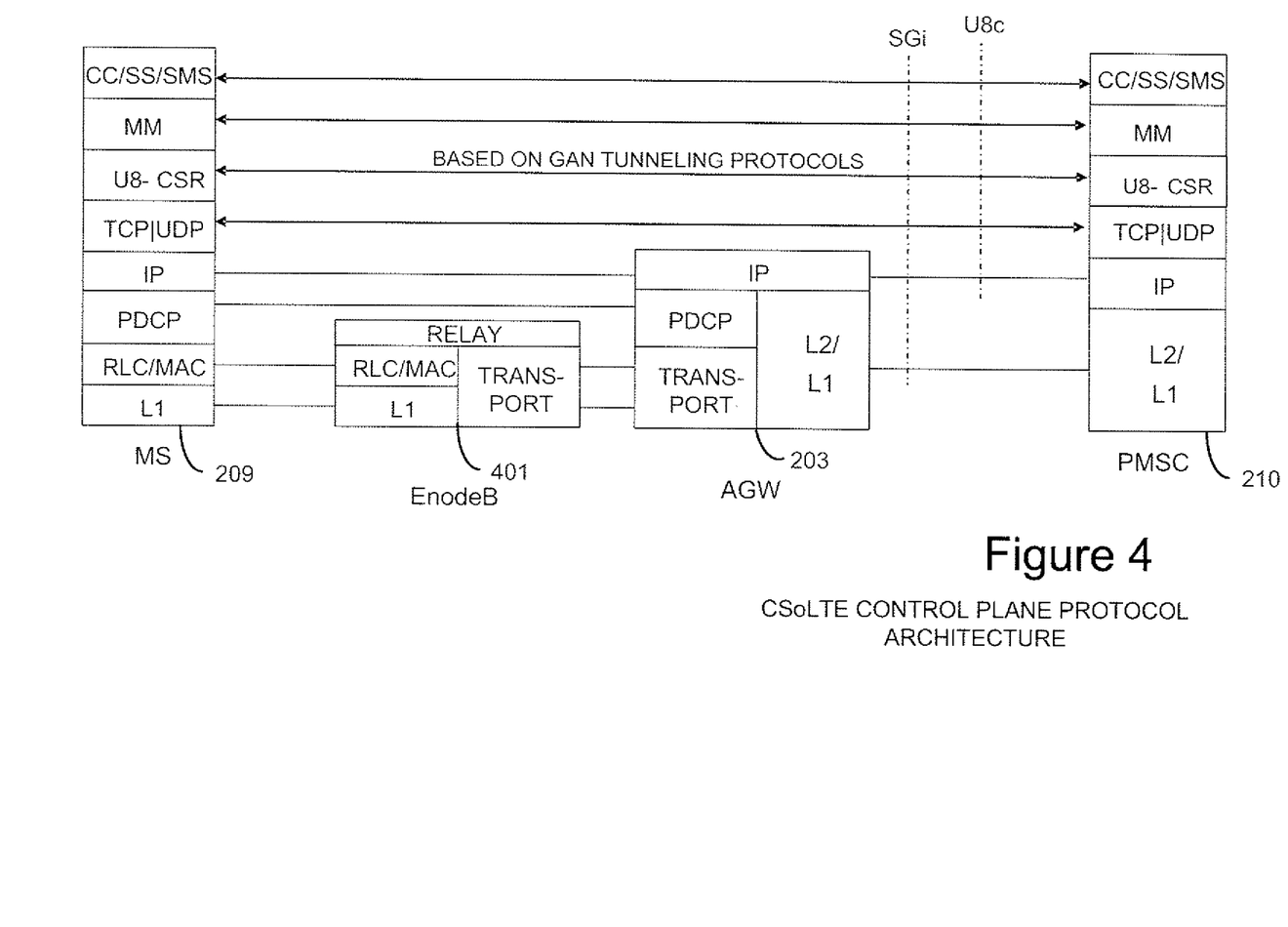
FIG. 4 is a block diagram illustrating the CSoLTE control plane architecture.
Figure 5:
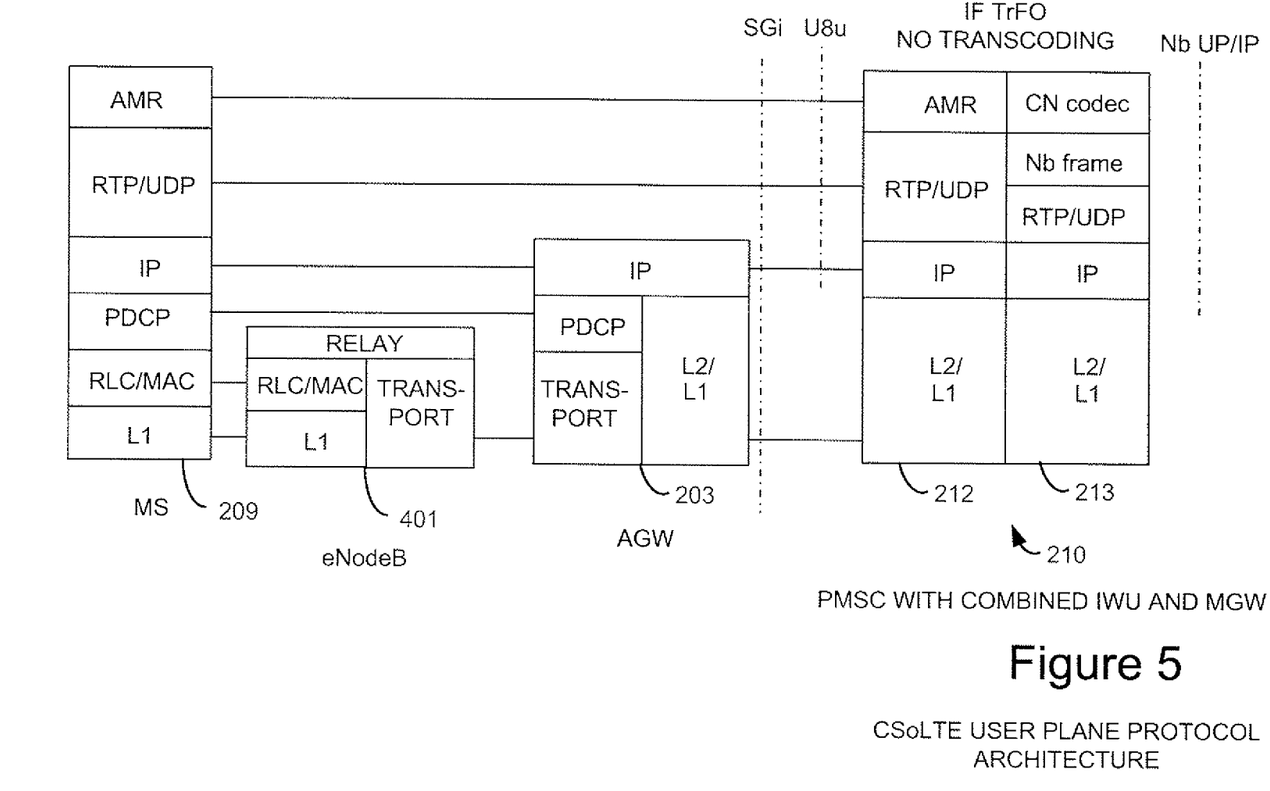
FIG. 5 is a block diagram illustrating the CSoLTE user plane architecture.

The control plane protocol architecture between the mobile terminal 209 terminal and the PMSC 210 (i.e. the U8c interface) is shown in FIG. 4. The user plane protocols between the mobile terminal 209 and the PMSC 210 (i.e. the U8u interface) are shown in FIG. 5. The intermediate network elements involved are an eNodeB 401 (located in LTE access network 202) and the access gateway AGW 203.

Returning to FIG. 3, three different solutions for providing CS over LTE have been identified so far. The first solution is called "CS Fallback" and means that a mobile terminal 209 is performing SAE MM (mobility Management) procedures towards the MME 204 while camping on the LTE access 202. The MME 204 registers the terminal in the MSC-S 214 for CS based services. When a page for CS services is received in the MSC-S 214 it is forwarded to the terminal via the MME 204 and then the mobile terminal 209 performs fallback to the 2G or 3G RANs 201. Similar behavior applies for Mobile originated CS services and when these are triggered and the mobile terminal 209 is camping on LTE access 202, it will fallback to 2G or 3G RANs 201 and trigger the initiation of the CS service there. This solution has been specified in the standard 3GPP TS 23.272.

The second solution is called CS over LTE Integrated (CSoLTE-I). In this solution the same SAE MM procedures as for "CS Fallback" are used, but instead of performing fallback to the 2G or 3G RANs 201, the mobile terminal 209 will perform all the CS services over the LTE access 202. This means that the CS services (also called Connection Management, CM procedures) are transported over IP-based protocols between the PMSC 210 and the mobile terminal 209 using the LTE access 202 and the SAE nodes like the AGW 203.

The third solution is called CS over LTE Decoupled (CSoLTE-D). In this case both MM and CM procedures are transported over IP-based protocols directly between the PMSC 210 and the mobile terminal 209 using the LTE access 202 and the SAE user plane nodes like the AGW 203.

3GPP has also standardized the Generic Access Network (GAN)-concept starting from 3GPP Release-6. The more correct name is "Generic Access to A/Gb Interfaces" and this standardization was based on the Unlicensed Mobile Access (UMA) de-facto specifications.

Figure 6:
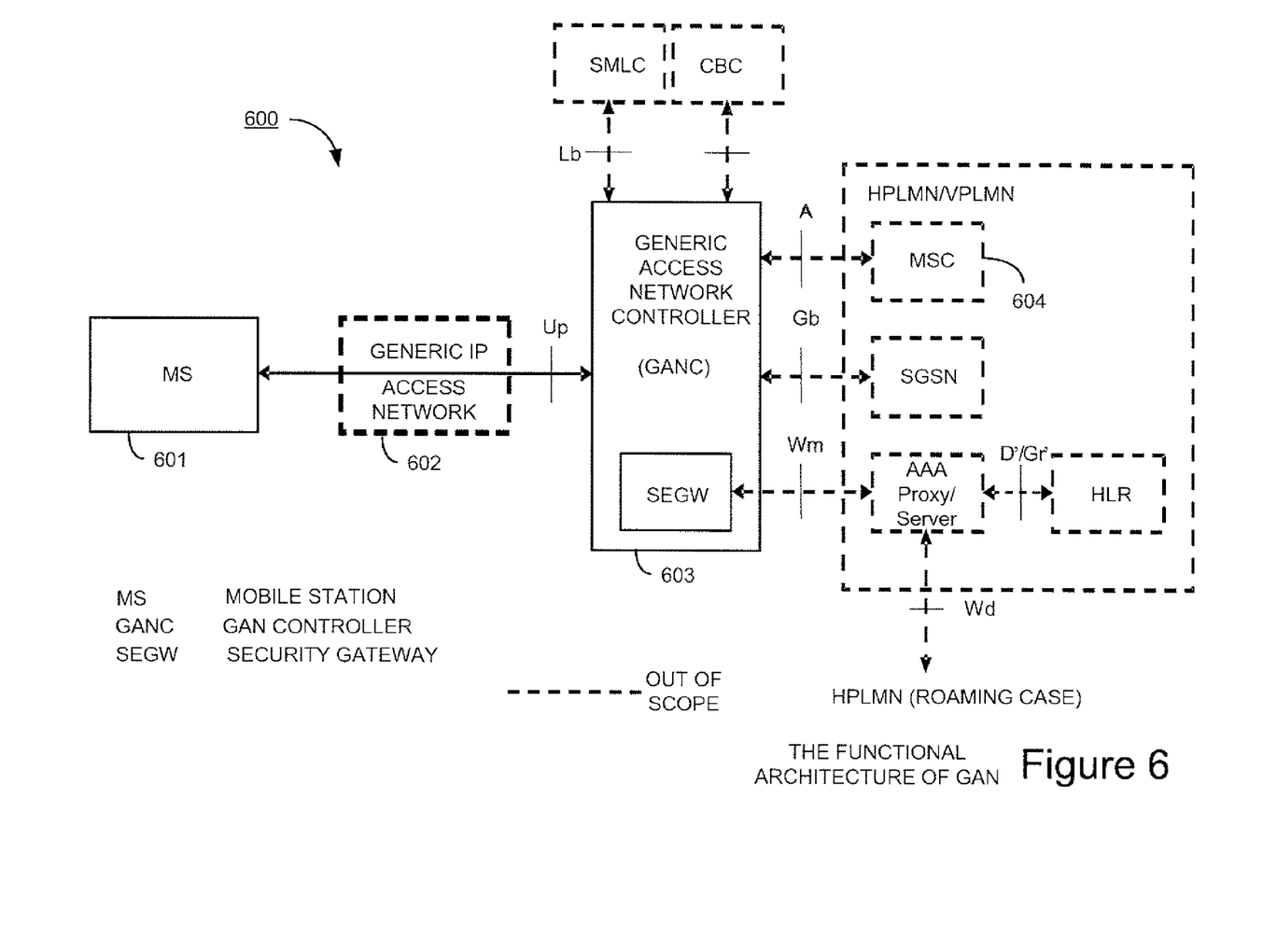
FIG. 6 is a block diagram illustrating the functional architecture of CAN.

GAN provides a new radio access network and the node corresponding to the GERAN (GSM EDGE Radio Access Network) BSC is called Generic Access Network Controller (GANC). GAN is specified in the 3GPP technical specifications TS 43.318 and TS 44.318. FIG. 6 shows the functional architecture of GAN 600 as described in TS 43.318. The basic principle is that the mobile terminal MS 601 is a dual-mode radio handset including for example both WiFi and 3GPP-macro radio support (GSM, WCDMA or both). The mobile terminal MS 601 connects to a WiFi Access point (AP) (not shown in FIG. 6) using the WiFi Radio. Between the WiFi Access point (AP) and the GANC 603 is a generic (packet based) IP access network 602 located. The GAN standard defines for example how the mobile terminal MS 601 can function in GAN mode and access the services provided by the GSM CN (Core Network) using the Up-interface between the MS mobile terminal MS 601 and the GANC 603.

The initial GAN standard can be called "2G-GAN" or "GSM-GAN" as the standard GSM interfaces, A and Gb are used between the GANC 603 and the CN. In addition, work is ongoing to standardize a "3G-GAN" or "WCDMA-GAN" solution. In this case, the GANC 603 will used the standard WCDMA interfaces, for example the Iu-cs and the Iu-ps interfaces to connect to the CN. The resulting standard can be also called "Generic Access to A/Gb Interfaces" or shortly "GAN-Iu".

The main principle in GAN 600 is that the mobile terminal MS 601 is configured with Provisioning GANC address information and this is the initial point of contact in the network and the mobile terminal MS 601 triggers the GAN Discovery procedure towards the Provisioning GANC that is placed in the Home PLMN (HPLMN). The only purpose of the GAN Discovery procedure is to provide the mobile terminal MS 601 with information about a Default GANC that also resides in the HPLMN. The Default GANC is the node where the mobile terminal MS 601 always connects to initially when it attempts to use GAN 600 in a new location. The Default GANC may redirect the mobile terminal MS 601 to a Serving GANC that may be placed either in the HPLMN or in a VPLMN (Visited PLMN). The mobile terminal MS 601 may also store information about Serving GANCs in a Serving GANC table.

Figure 7:
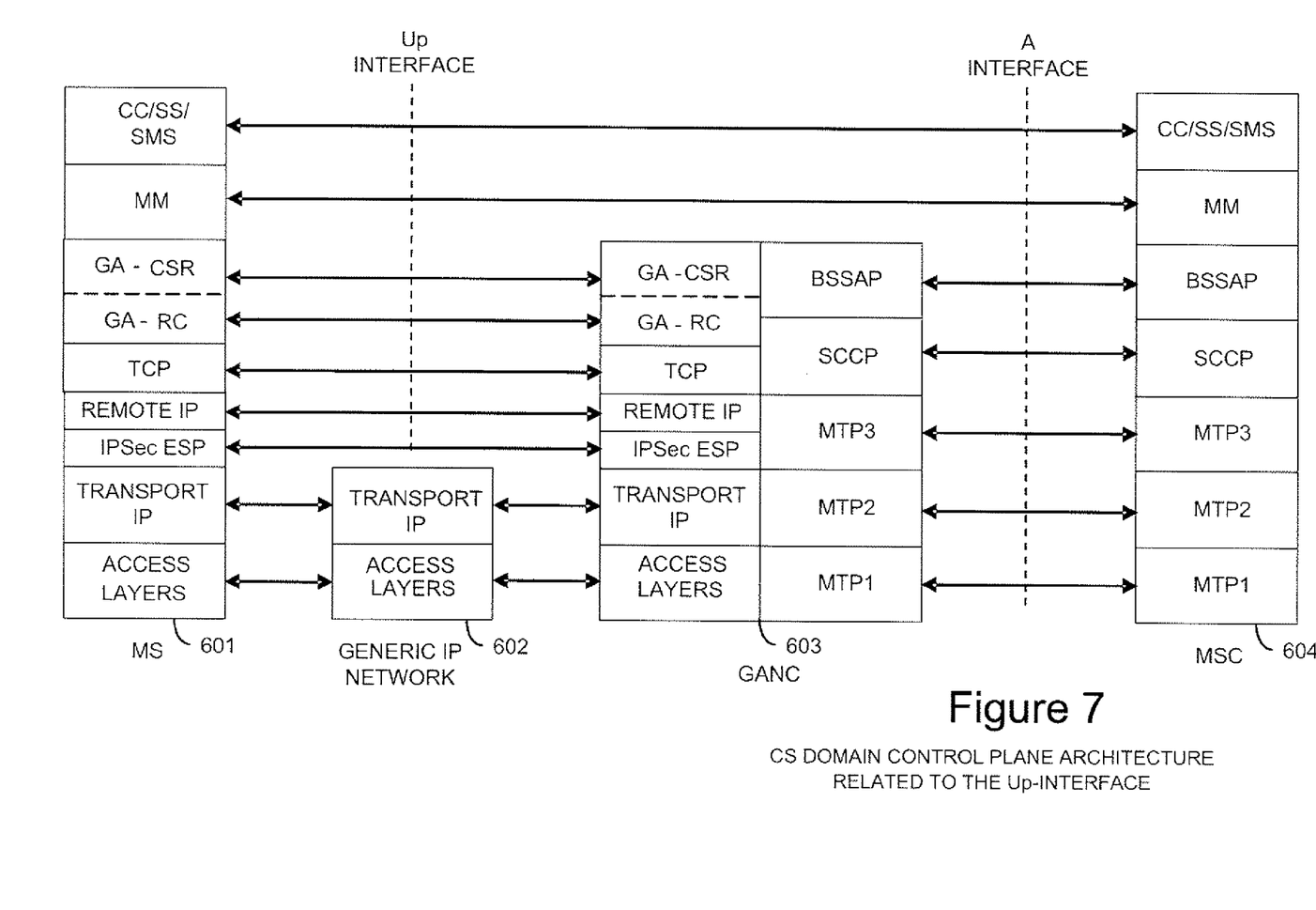
FIG. 7 is a block diagram illustrating the CS domain control plane architecture related to the Up interface.

FIG. 7 shows the CS Domain Control Plane Architecture related to GAN and the Up-interface. The main principle is that the GANC 603 uses the normal A-interface signaling towards the MSC 604 and interworks the related protocol, like BSSAP, towards the relevant GAN-protocols, like GA-CSR (Generic Access, Circuit Switched Resources), in both directions.

Figure 8:
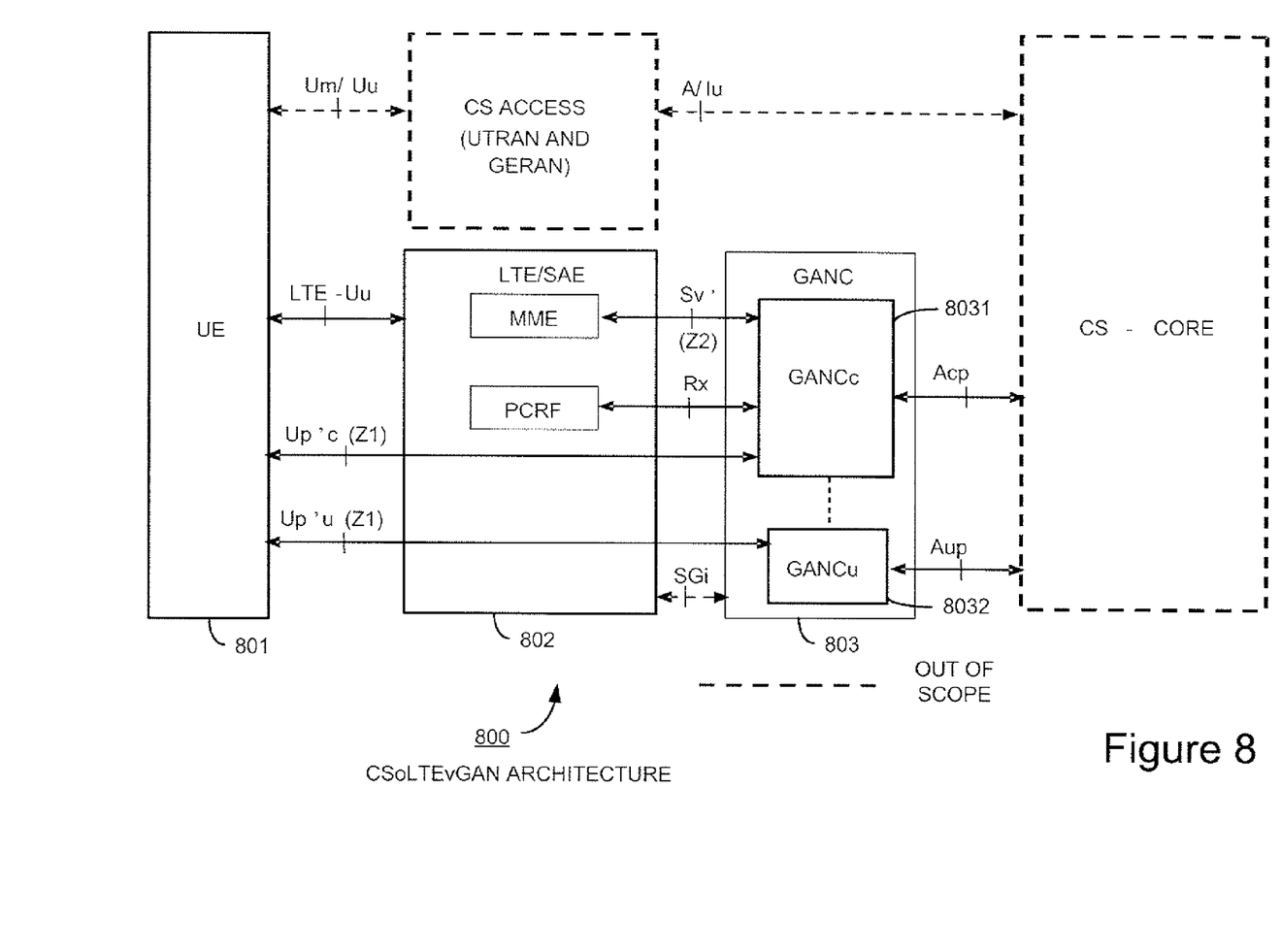
FIG. 8 is a block diagram illustrating the CSoLTEvGAN architecture.

The solution of using the CAN concept for CS over. LTE (CSoLTEvGAN) is illustrated in FIG. 8. The basic idea for the CSoLTEvGAN alternative is to see LTE/SAE 802 as a Generic Access Network and to use the CAN protocols for control GANCc 8031 and user plane GANCu 8032 between the mobile terminal UE 801 and the GANC 803.

The CS services are basically VPLMN services, thus execution of calls are mainly done in a MSC within the VPLMN. Therefore the CSoLTEvGAN should also be a VPLMN service, thus the CS service should be handled by a MSC within the VPLMN. This means that also the serving GANC must be present in then VPLMN, and that it must be possible to use local breakout for the Access Point Name (APN) used for CSoLTEvGAN.

Figure 9:
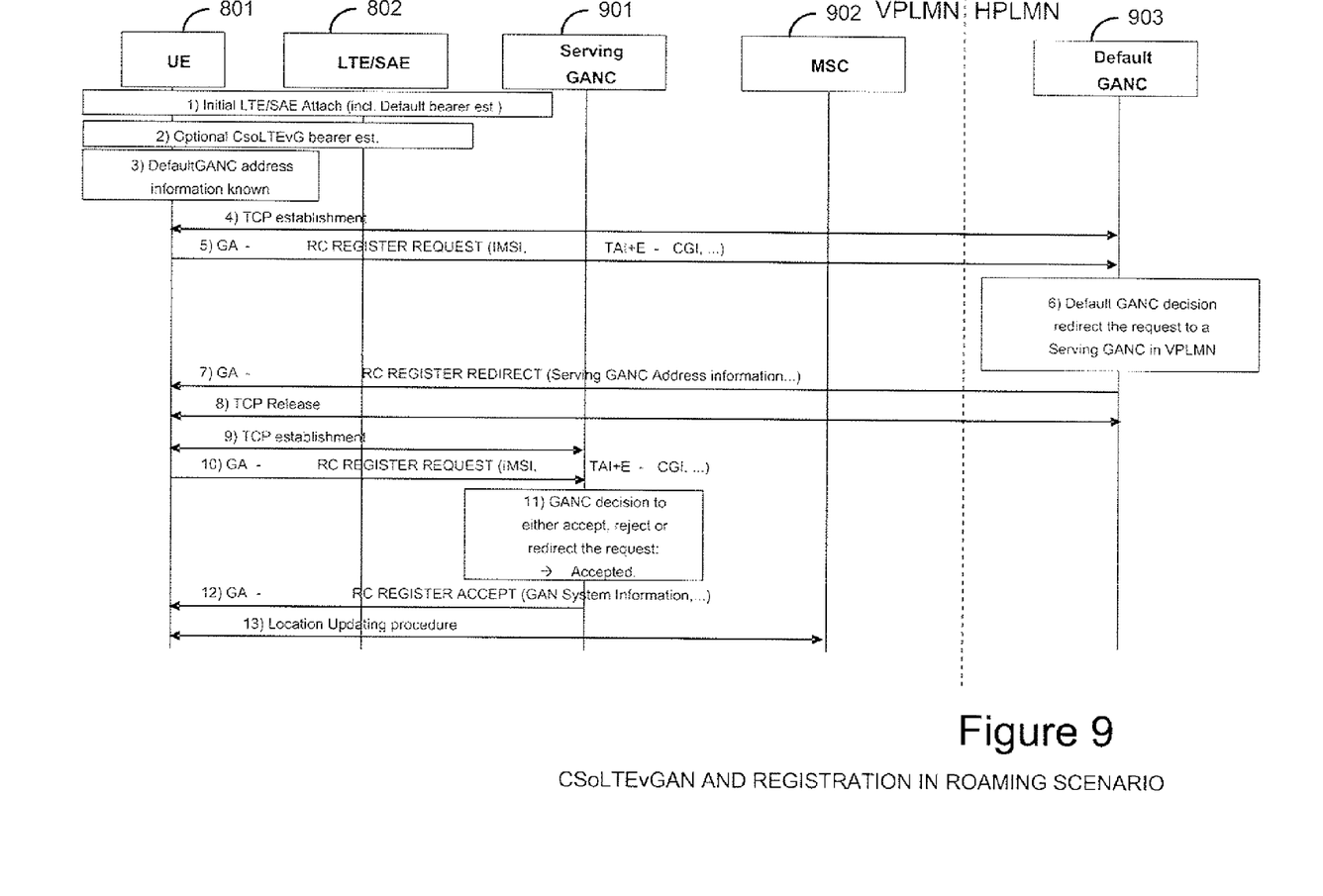
FIG. 9 is a flow chart illustrating a registration scenario in CSoLTEvGAN.

The current CAN principles do support roaming scenarios, and is illustrated in FIG. 9. However, the main principle is that the mobile terminal UE 801 located in a VPLMN contacts a Default GANC 903 in the HPLMN for each new location (i.e. E-UTRAN TA, Tracking Area or cell in the CSoLTEvGAN solution) and then the Default GANC 903 in the HPLMN redirects the mobile terminal UE 801 to a Serving GANC 901 in the current VPLMN.

Figure 10:
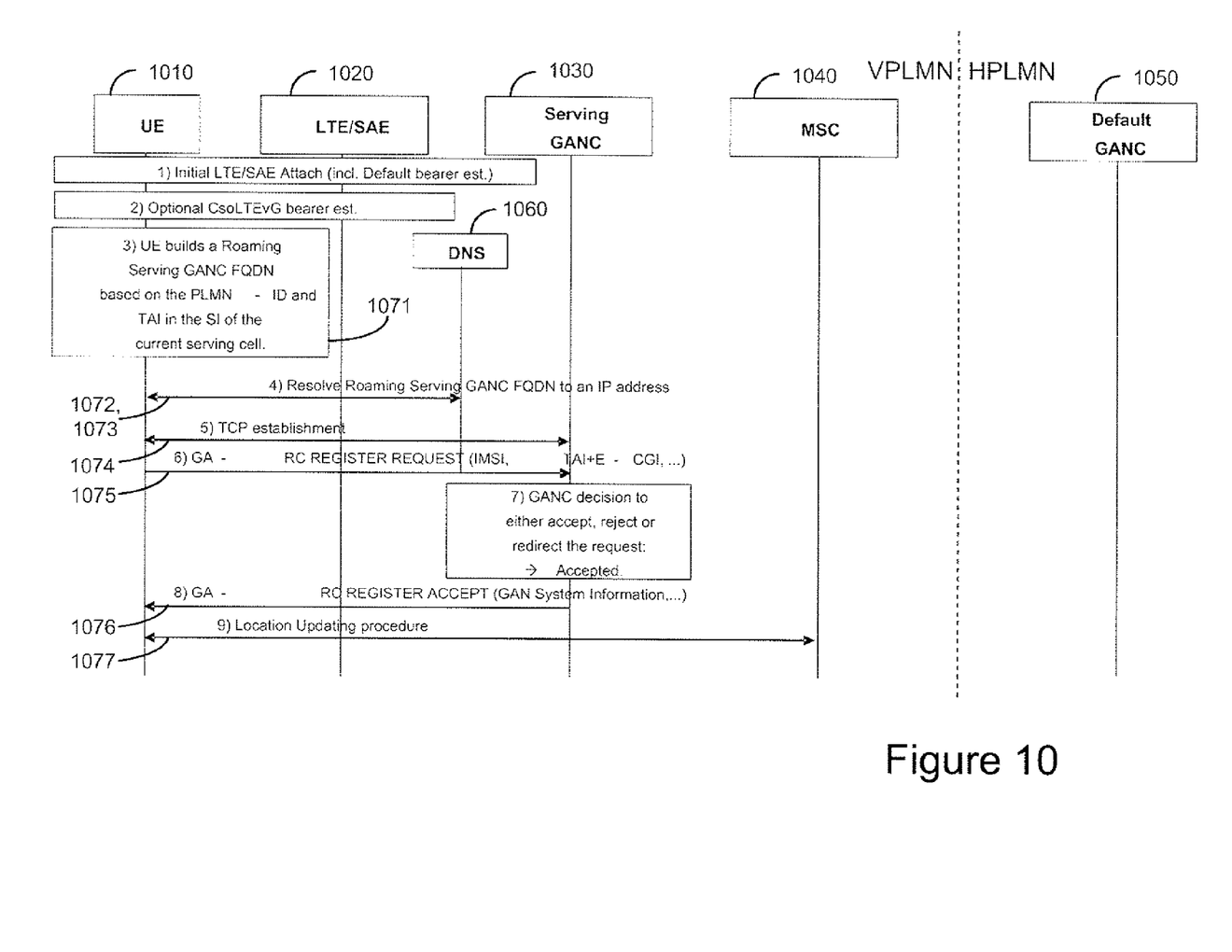
FIG. 10 is a flow chart illustrating the method to register a mobile terminal to a GANC according to the current invention.

The current invention comprises a more efficient way for a mobile terminal 801 to register to a GANC 901 in a roaming scenario. One embodiment of the invention is illustrated by the flow chart in FIG. 10. FIG. 10 illustrates the information flow and the network elements involved which are a mobile terminal UE 1010, an intermediate LTE/SAE network 1020, a serving GANC 1030, an MCS 1040 and a Domain Name System, DNS Server 1060. The figure also includes a Default GANC 1050 located in the HPLMN. The serving GANC 1030 is located in the VPLMN.

The mobile terminal, UE 1010 determines in step 1071 system information about the E-UTRAN cell by which it is served. A Fully Qualified Domain Name, FQDN string is built based on the system information.

The system information in this embodiment comprises the PLMN ID (Mobile Country Code, MCC+Mobile Network Code, MNC) and the Tracking Area Identity (TAT) broadcasted in the system information in the current E-UTRAN cell. In addition, the cell identity can optionally be used.

The FQDN string is sent in step 1072 to the DNS server 1060 which resolves the FQDN to an IP address to either a Serving GANC (1030) or a local Default GANC (not shown) in the VPLMN. The differences between the two types of GANCs are described further below. When the resolved IP address to the GANC 1030 is received in step 1072, the mobile terminal UE 1010 establishes in step 1074 a TCP connection to the GANC 1030.

In step 1075, the mobile terminal UE 1010 performs the registration procedure by sending a RC Registration Request towards the GANC 1030 in the VPLMN (i.e. without contacting the Default GANC 1050 in the HPLMN).

FIG. 10 (Box 7) also shows the possibility that the GANC 1030 may redirect the registration request from the mobile terminal UE 1010 to another GANC in the VPLMN. In one embodiment this is done by sending a Registration Redirect from the first GANC 1030 back to the mobile terminal UE 1010 where the Registration Redirect comprises the IP address to another GANC within the same VPLMN. When the mobile terminal UE 1010 receives the Registration Redirect it uses the received IP address for making a new attempt to register to the another GANC in the same way as described above for the first GANC 1030.

If the GANC 1030 (or the other GANC towards which the first GANC 1030 redirects the registration request) accepts the registration request, it sends in step 1076 a Register Accept to the mobile terminal UE 1010 and the Location Updating procedure with the MSC 1040 can be performed in step 1077.

The GANC 1030 (or the GANC towards which the first GANC 1030 redirects the registration) may also reject the registration.

In other embodiments of the invention, the system information about the E-UTRAN cell can comprise other or additional types of information or a combination thereof. For example, the system information that forms the basis for the FQDN string can also comprise preconfigured data stored in a subscriber identity module SIM, also called a SIM card located in the mobile terminal UE 1010. The preconfigured data in the SIM card can for example be an identifier string like "operator.com". This identifier string is called below pre-conf-operator-id. In yet another embodiment, a standardized identifier like the fixed domain name ".pub.3gppnetwork.org" could be used.

The system information about the E-UTRAN cell can for example comprise the following data:
  A predefined string such as "GANC" (see explanation below)
  PLMN-ID only
  PLMN-ID and TAC
  TAC only
  pre-conf-operator-id and TAC Following examples describe some possible combinations of system information and how to build the FQDN string. Assume that:
  the pre-conf-operator-id set to "operator.com".
  the PLMN-ID is 014-125 (i.e. Mobile Country Code, MCC, is 014 and Mobile Network Code, MNC, is 125).
  the TAC has the value 34567.

For example, the following FQDNs could be constructed based on this information:
If only "pre-conf-operator-id" and TAC is used:
FQDN string H→"34567.operator.com".
If PLMN-ID, TAC and a standardized string is used:
FQDN string H→"tac34567.mnc125.mcc014.pub.3 gppnetwork.org".

In situations where it is determined that the CSoLTEvGAN architecture has its own Access Point Name (APN) and thereby connected to a specific packet data network, PDN the only FQDN string needed would be a predefined string such as "GANC".

As described above, the FQDN string is used in the query to the DNS server 1060 in order to get the IP-address for a local Default GANC or a Serving GANC 1030 in the VPLMN.

The difference between the local Default GANC and the Serving GANC 1030 is the behavior of the mobile terminal 1010 UE in case of some malfunction in the network. If the mobile terminal UE 1010 cannot contact the current serving GANC 1030 it has two options. The first one is to do the FQDN procedure. In this case the FQDN resolution procedure will give the address of a new Serving GANC. The other option is to contact the local Default GANC. The local default GANC has earlier been identified by the mobile terminal UE 1010 by a corresponding FQDN resolution procedure.

Again, the local Default GANC and the serving GANC 1030, is located in the same VPLMN. The Default GANC 1030 located in the HPLMN is not involved.

Figure 12:
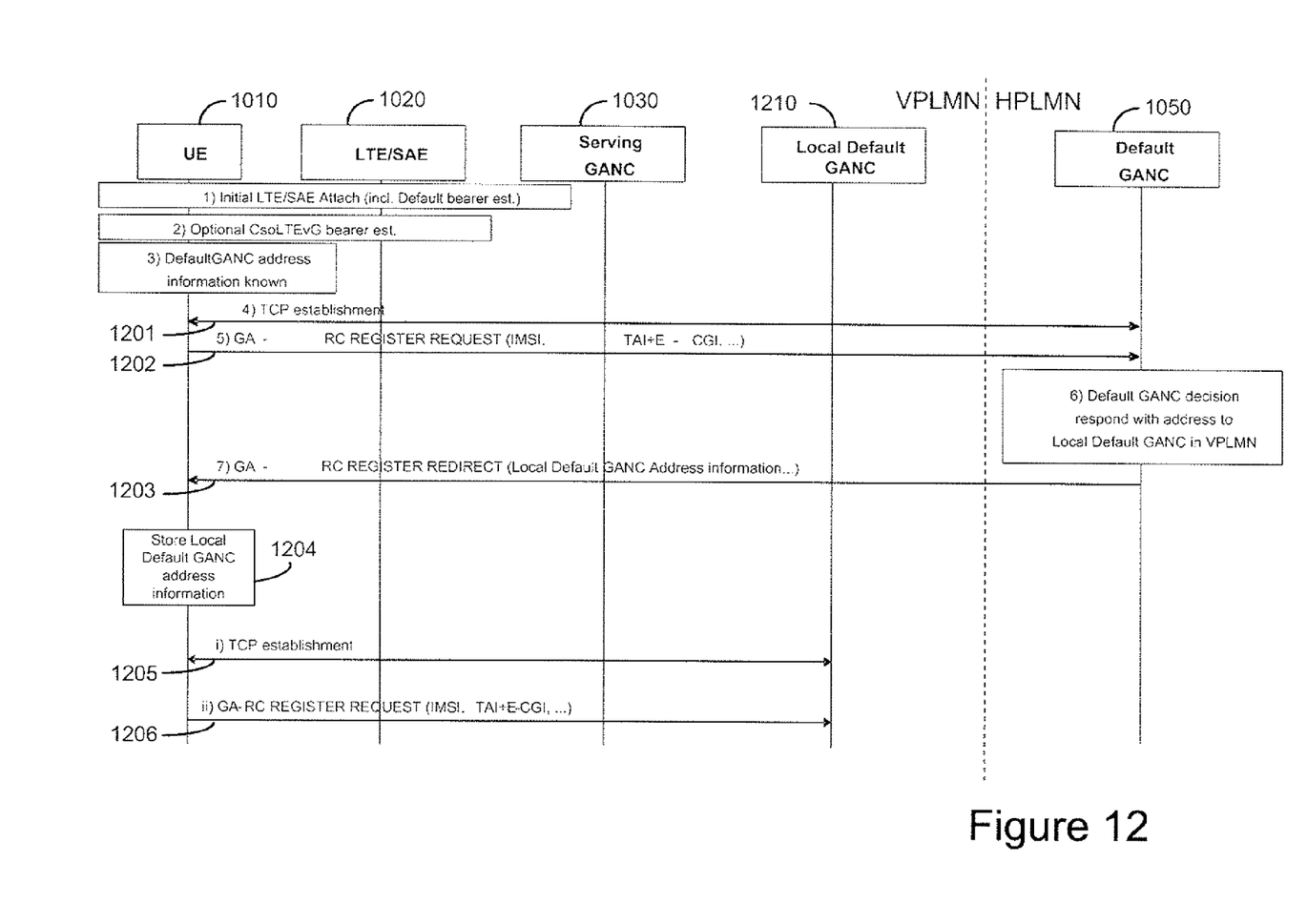
FIG. 12 is a flow chart illustrating the method to discover a local default GANC according to the current invention.

As an alternative to the method described above, the mobile terminal UE 1010 always performs GAN Registration towards the Default GANC 1050 in the HPLMN when it attempts to use CSoLTEvGAN in a new VPLMN. This is illustrated in FIG. 12. In this case, the mobile terminal 1010 establishes in step 1201 a TCP connection and sends in step 1202 a register request to the Default GANC 1050 in the HPLMN. The Default GANC 1050 in the HPLMN indicates in step 1203 to the mobile terminal 1010 that it should use a local Default GANC 1210 in the VPLMN for future register requests (steps 1205, 1206) as long as it is connected/camping on the VPLMN. This local Default GANC 1210 can be also called the VPLMN specific Default GANC. The indication from the Default GANC 1050 in the HPLMN can for example be included in a GA-RC REGISTER REDIRECT message together with address information about the VPLMN specific Default GANC 1210. The address information is stored in the mobile terminal 1010 in step 1204.

Figure 11:
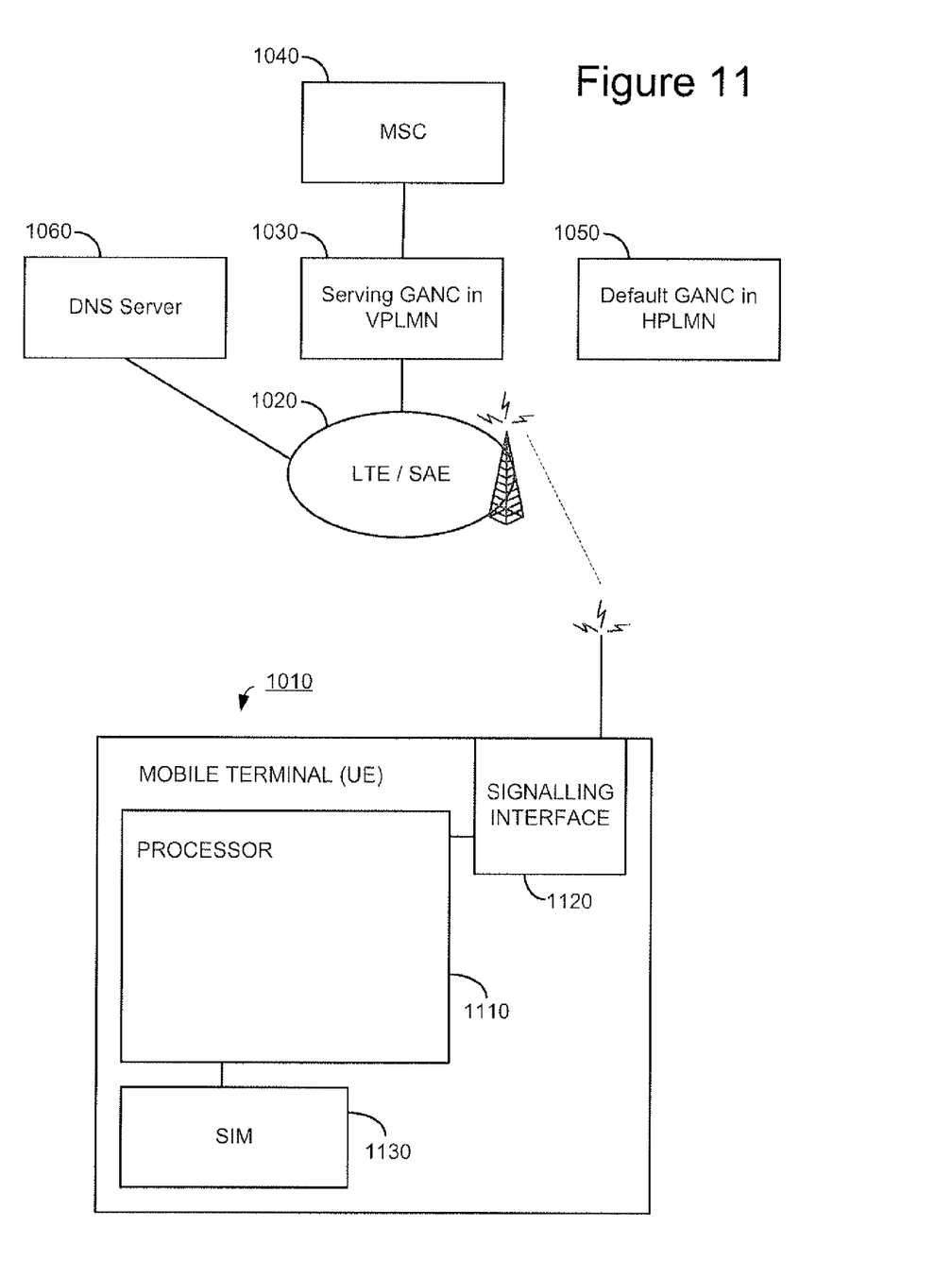
FIG. 11 is a block diagram illustrating an embodiment of a mobile terminal according to the current invention.

FIG. 11 illustrates a block diagram of the involved network elements described above including the mobile terminal UE 1010. The mobile terminal 1010 comprises a processor 1110 and a signaling interface 1120 coupled to the processor 1110. The mobile terminal 1100 does in some embodiments of the invention also make use of a subscriber identity module SIM 1130 normally in the form of a so called a SIM card.

The processor 1110 is adapted to determine system information about the Evolved Universal Terrestrial Radio Access, E-UTRAN cell by which the mobile terminal UE 1010 is served and further adapted to build a Fully Qualified Domain Name, FQDN string based on the system information. The signaling interface 1120 is adapted to communicate with the processor 1110 and further adapted to send the FQDN string to the Data Name Server, DNS 1060 and to receive a resolved IP address to the GANC 1030. The signaling interface 1120 is further adapted to establish a transmission control protocol, TCP connection with the GANC 1030 and send a register request to said GANC 1030. The processor 1110 is further adapted to read additional system information stored in the SIM card 1130.

The invention claimed is:

1. A method for a mobile terminal located in a visited public land mobile network (VPLMN) to discover a generic access node controller (GANC) in a Circuit Switched Services over Long Term Evolution using Generic Access Network CSoLTEvGAN) architecture, the method comprising:
    establishing a transmission control protocol (TCP) connection with a first default GANC in a home public land mobile network (HPLMN);
    sending a register request, for a serving GANC to serve the mobile terminal, to the first default GANC;
    receiving from the first default GANC an address to a second default GANC located within the same VPLMN as the mobile terminal; and
    storing the address to the second default GANC and assigning said second default GANC as the GANC to which the mobile terminal will send future registration requests for a serving GANC to serve the mobile terminal while in the VPLMN as long as the mobile terminal is connected to or camped on the same VPLMN as the second default GANC.

2. The method of claim 1, further comprising determining, by the mobile terminal, system information about a cell by which the mobile terminal is served, and determining, by the mobile terminal, the first default GANC based on the system information.

3. The method of claim 2, wherein the cell is an Evolved Universal Terrestrial Radio Access (E-UTRAN) cell.

4. The method of claim 2, wherein receiving from the first default GANC an address to a second default GANC located within the same VPLMN as the mobile terminal comprises receiving a register redirect message from the first default GANC comprising the address.

5. The method of claim 4, wherein the address in an IP address of the second default GANC.

6. The method of claim 5, wherein the IP address of the second default GANC is determined based on a fully qualified domain name (FQDN) string sent to a Domain Name System (DNS) server, wherein the DNS server resolves the FQDN string to an IP address to the second default GANC.

7. The mobile terminal of claim 2, wherein the address to a second default GANC located within the same VPLMN as the mobile terminal comprises received from the first default GANC comprises a register redirect message received from the first default GANC comprising the address.

8. The mobile terminal of claim 7, wherein the address in an IP address of the second default GANC.

9. The mobile terminal of claim 8, wherein the IP address of the second default GANC is determined based on a fully qualified domain name (FQDN) string sent to a Domain Name System (DNS) server, wherein the DNS server resolves the FQDN string to an IP address to the second default GANC.

10. The method of claim 2, wherein the system information comprises any of the following or a combination thereof: a tracking area code TAC value; and an identification of the VPLMN.

11. The method of claim 10, wherein the system information further comprises preconfigured information stored in a subscriber identity module (SIM) in the mobile terminal.

12. The method of claim 11, wherein the preconfigured information stored in the SIM comprises an operator identity string.

13. The method of claim 10, wherein the system information further comprises a standardized string comprising a fixed domain name.

14. A mobile terminal adapted to discover a generic access node controller (GANC) in a Circuit Switched Services over Long Term Evolution using Generic Access Network (CSoLTEvGAN) architecture, the mobile terminal comprising:
    a processor; and
    a signaling interface coupled to the processor and adapted to establish a transmission control protocol (TCP) connection with a first default GANC in a home public land mobile network (HPLMN), and
        wherein the signaling interface is further adapted to send a register request, for a serving GANC to serve the mobile terminal, to the first default GANC and to receive from the first default GANC an address to a second default GANC located within the same visited public land mobile network (VPLMN) as the mobile terminal, and
        wherein the processor is further adapted to store the address to the second default GANC and to assign said second default GANC as the GANC to which the mobile terminal, as long as it is connected to or camped on the same VPLMN as the second default GANC, will send future registration requests for a serving GANC to serve the mobile terminal.

15. The mobile terminal of claim 14, wherein the processor is configured to determine system information about a cell by which the mobile terminal is served, and to determine the first default GANC based on the system information.

16. The mobile terminal of claim 15, wherein the cell is an Evolved Universal Terrestrial Radio Access (E-UTRAN) cell.

17. The mobile terminal of claim 15, wherein the system information comprises any of the following or a combination thereof: a tracking area code TAC value; and an identification of the VPLMN.

18. The mobile terminal of claim 17, wherein the system information further comprises preconfigured information stored in a subscriber identity module (SIM) in the mobile terminal.

19. The mobile terminal of claim 18, wherein the preconfigured information stored in the SIM comprises an operator identity string.

20. The mobile terminal of claim 17, wherein the system information further comprises a standardized string comprising a fixed domain name.

* * * * *